Helmut Bresslein
Klaus Korte
INVENTORS.
BY Karl F. Ross
Attorney

Helmut Bresslein
Klaus Korte
INVENTORS.

BY Karl G. Ross
Attorney

HELMUT BRESSLEIN
KLAUS KORTE
*INVENTORS*

BY Karl F. Ross
*Attorney*

United States Patent Office 3,474,957

Patented Oct. 28, 1969

3,474,957

ACTUATING MECHANISM FOR RESULT KEY IN CALCULATOR HAVING MULTIPLICATION FACILITY

Helmut Bresslein, Middelsfahr, and Klaus Korte, Braunschweig, Germany, assignors to Olympia Werke AG, Wilhelmshaven, Germany, a corporation of Germany Filed May 8, 1967, Ser. No. 636,720

Claims priority, application Germany, May 6, 1966, O 8,772

Int. Cl. G06c 29/00

U.S. Cl. 235—60 5 Claims

ABSTRACT OF THE DISCLOSURE

Calculator wherein the result of a multiplication is printed or otherwise registered by actuation of a key in response to an end-of-operation signal, such actuating being blocked in an off-normal position of a pin carriage containing the multiplicand and being further inhibited under certain conditions (as upon performance of a multiplication exceeding the storage capacity of the totalizer), an end-of-multiplication signal being communicated to the result key from a sensing device, associaed with a shift-multiplier register, via a resilient linkage storing the actuating force in the blocked state of the key.

Our present invention relates to a calculator having an arithmetic unit for the performance of multiplications, possibly as an attachment to a conventional adding machine, e.g. as described in our copending application Ser. No. 639,719 of even date, now Patent No. 3,406,899.

As disclosed in our above-identified application, the arithmetic unit may include means for storing a multiplicand, e.g. in the form of a shiftable pin carriage as is well known per se, in combination with a shiftable register for the temporary storage of a multidigit multiplier which, in each of its several operating positions, counts the number of times the multiplicand is to be transferred to the totalizer in accordance with the numerical value of a respective multiplier digit. When all the significant digits have been counted, a sensing device associated with the multiplier register produces and end-of-operation signal to actuate a display device, usually a printer, for visually indicating the results stored in the totalizer; this may occur upon the arrival of the multiplier register in a terminal position, or at some earlier stage if the uncounted digits of this register are all zeros. In the embodiment specifically disclosed in our copending application, the multiplier register has a plurality of digital slides cooperating with a swingable bar, upon a restoration of all the slides to their zero position, moves toward the slide support and thereby produces the end-of-multiplication signal.

In such a system, particularly if it involves an adaptation of an adding machine to multiplication operation, it can happen that the capacity of the totalizer is insufficient to store the result if both the multiplicand and the multiplier have as many or nearly as many significant digits as can be accommodated by their respective storage means, i.e. by the pin carriage and the shiftable multiplier register. In this case the pin carriage, starting from a position corresponding to the highest-order significant digit of the multiplicand, will return to its units position and complete the loading of the totalizer at the stage before the end-of-multiplication signal has been emitted by the sensing device associated with the multiplier register. If the arithmetic unit now continues to operate until all the significant digits of the multiplier have been counted, the result stored in the totalizer and ultimately reproduced by the printer will be incorrect. Although it is possible to indicate this fact by a special mark on the printing strip, the user may on occasion overlook the significance of this entry.

Furthermore, it is desirable in such machines to prevent the operation of the printer control until not only the multiplier register has been reset, and with it the digit keys of the selector, but also the multiplicand register (i.e. the pin carriage) has been returned to its units position. Means for blocking a result key in the off-normal position of the pin carriage and the selector are well known, e.g. from U.S. Patent No. 2,984,412 to O. J. Sundstrand.

The general object of our present invention is to provide simple means for automatically operating the display unit of a calculator in response to two not necessarily simultaneous signals, i.e. an end-of-multiplication signal from a multiplier register and an unblocking signal from a multiplicand register or from a manually actuatable release device for a printing inhibitor.

A more particular object of our invention is to provide means for automatically controlling a manually operable key (e.g. the summing key of an adding machine) in the aforedescribed manner.

It is also an object of this invention to provide a compact mechanism for the control of a product printer in a calculator converted from adding to multiplying operation.

These objects are realized, pursuant to our present invention, by the provision of a resilient linkage connecting an operating element of a calculator, such as a manually depressible result key, with an actuating mechanism therefor controlled by the aforedescribed sensing device for the multiplier register, the actuating force of this mechanism being stored in the resilient linkage upon the immobilization of the operating element by a blocking member controlled by the multiplicand register and/or by a releasable stop responsive to an inhibition signal which may be emitted by the arithmetic unit in the event that the capacity of the totalizer is exceeded. This resilient linkage may comprise a pair of levers interconnected by a spring, one of these levers bearing upon the result key to depress it if the blocking member has become ineffectual, following return of the multiplicand register to normal, and if no inhibition signal has been emitted or if the same has been manually canceled by the user.

The above and other features of our invention will be described in greater detail with reference to the accompanying drawing in which.

Figure 1:
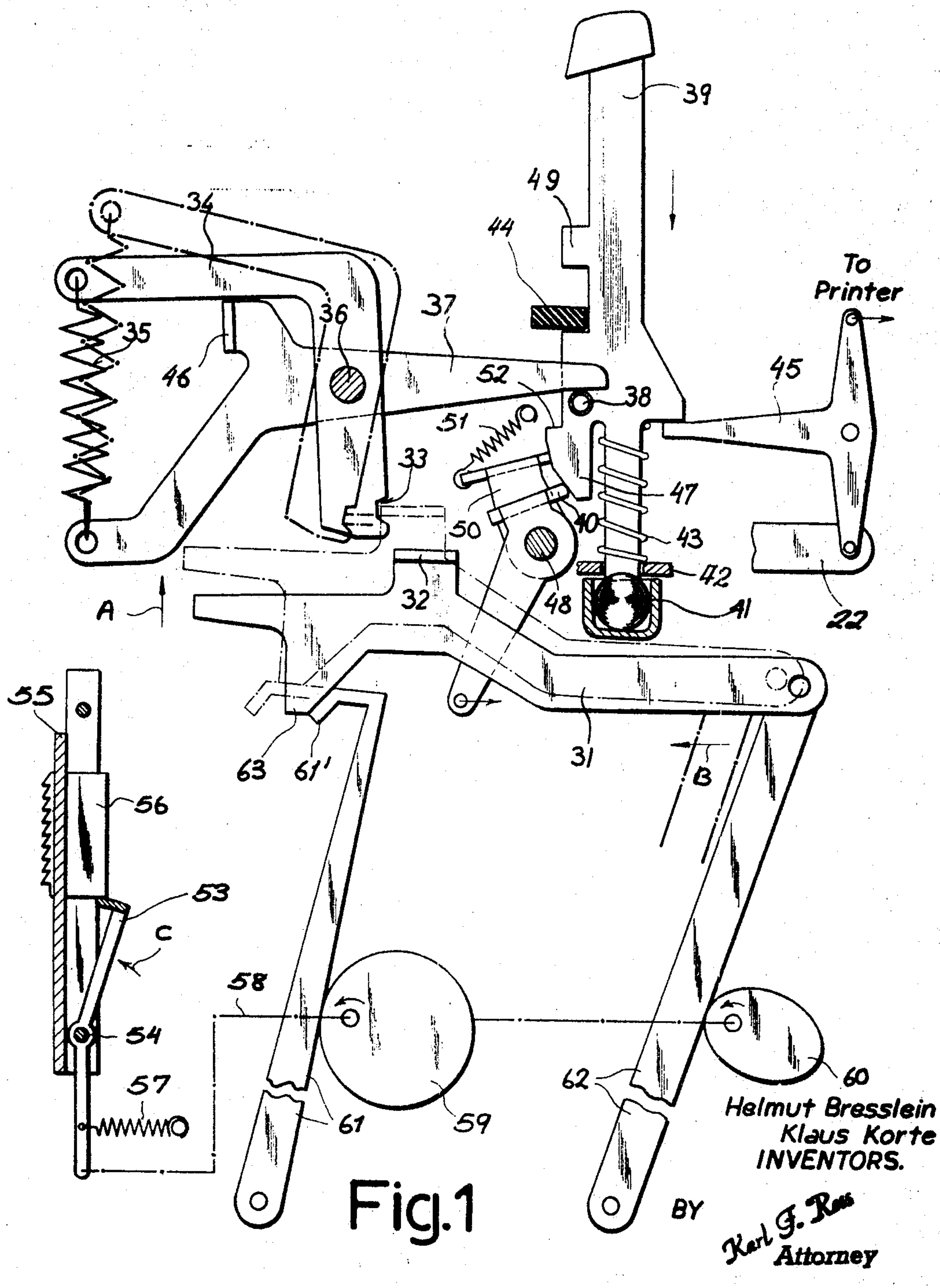
FIG. 1 is a somewhat diagrammatic view of an assembly for operating a result printer of a calculator provided with an inhibitor in accordance with this invention.

In FIG. 1 we have shown a key 39 which may be the summing key of an adding machine equipped with a multiplication attachment of the type described in our above-identified copending application. Key 39 is movably guided in a portion 42 of the machine frame, against the force of a biasing spring 43, to an extent limited by the engagement of a lug 49 of the key with a stationary abutment 44. The lower end of key 39 bears upon a ball 41 which forms part of a conventional mechanism for blocking the descent of the key until all of the digital keys (not shown) of the selector have been reset, in step with the shifting of a multiplier register 55, 56 described hereinafter; another blocking member 40 swingable about a fixed pin 48 bears upon a camming surface of a lug 47 on key 39 to lock it in position as long as a pin carriage 70 (FIG. 4) is in an off-normal position. This arrangement for blocking the key is similar to one shown in the aforementioned Sundstrand patent and has therefore not been illustrated in detail.

A conventional mechanism for actuating a numerical printer, whose digit wheels are set in accordance with a number stored in a totalizer (not shown), is controlled by a lever 45 which is connected to a bar 22 so as to form a stop for arresting the key when this bar is immobilized in a manner described hereinafter with reference to FIGS. 2–4.

Key 39 also carries a stud 38 overlain by an arm of a lever 37 which is pivotable about a fixed fulcrum 36. Swingably mounted on the same fulcrum is another lever 34 having a notch 33, a tension spring 35 being anchored to respective ends of levers 34 and 37 in a manner tending to hold lever 34 against a lug 46 integral with lever 37. A latch 50, pivoted on pin 48 and biased by a spring 51, is engageable with a shoulder 52 of lug 47 to hold the key 39 in a lowered position after the same has been depressed, manually or automatically as hereinafter described, against the force of spring 43.

An arm 31 is arranged to execute a composite motion with an upward component (arrow A) and a leftward component (arrow B) to transmit an end-of-multiplication signal to key 39 by way of the linkage 34–37, a lug 32 on this arm engaging upon such motion in a notch 33 of lever 34 whereupon that lever is swung clockwise, against the stress of spring 35, into a position illustrated in heavy phantom lines. If, at such time, pin carriage 70 (FIG. 4) is still off-normal to immobilize blocking lever 40 and/or a selector key has been inadvertently depressed, key 39 cannot descend and its stud 38 retains the lever 37 in its illustrated position so that spring 35 is tensioned to store the force transmitted to the linkage 34–37 by the actuating element 31. If, subsequently, member 40 and ball stop 41 are released, this stored force will cause a delayed displacement of key 39 to operate the printer unless key 39 is still arrested by the lever 45 upon immobilization of the bar 22; in the latter case the printer will be operated upon the liberation of bar 22 by the user as also described further on.

The end-of-multiplication signal is generated, as in the system of our above-identified copending application and patent, by a swingable bar 53 fulcrumed at 54 to the frame 55 of the multiplier register having a set of digital slides 56 (only one shown) vertically movable therein; when any of these slides is lowered from its illustrated top or zero position to register a significant digit of a multiplier, a counting mechanism (not shown here but described fully in our aforementioned application and patent) goes into action and progressively resets the slide to zero whereupon the register is shifted, in a direction parallel to axis 54, to align the next slide with the counting means. As soon as all the slides 56 have been fully raised, sensing bar 53 swings counterclockwise (arrow C) under the urging of a spring 57 and, via a linkage indicated diagrammatically at 58, causes the rotation of two cams 59, 60 which may be carried on the main drive shaft of the machine or on separate shafts coupled therewith. Cam 59 thereupon displaces a follower 61 whose extremity 61′ coacts with a lug 63 on arm 31 to cam it upwardly (arrow A) as indicated in thin phantom lines; thereafter, cam 60 acts upon a follower 62 which drives the arm 31 forwardly (arrow B) to bring about the position indicated in heavy phantom lines.

Figure 2:
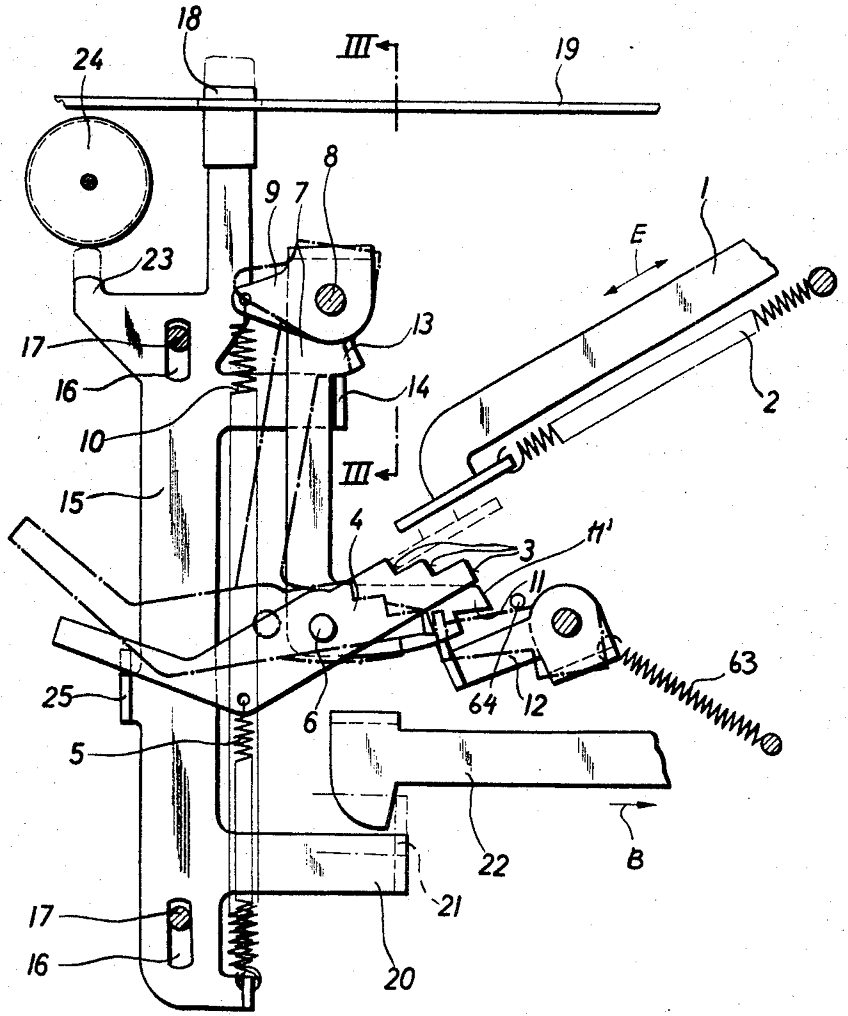
FIG. 2 is a similarly diagrammatic view of the mechanism associated with the unit of FIG. 1 for producing an inhibition signal under certain conditions.
Figures 3, 4:
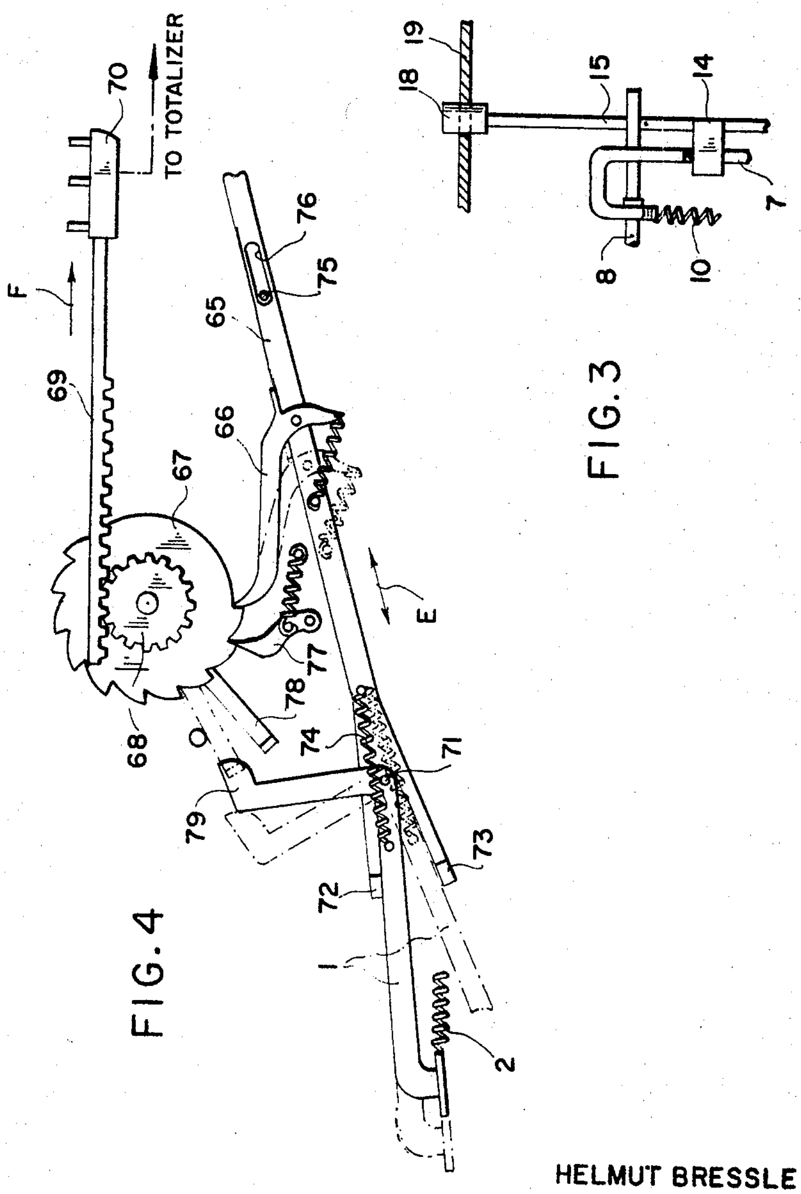
FIG. 3 is a fragmentary view taken on the line II—II of FIG. 2.
FIG. 4 is a detail view showing further elements associated with the mechanism of FIG. 2.

Reference will now be made to FIGS. 2–4 for a description of the means for controlling the inhibition of key operation by way of bar 22. This bar coacts with a detent 21 on a lug 20 of an arm 15 which is vertically guided by means of pins 17 engaging in slots 16 thereof. An extension of arm 15 carries a pushbutton 18 projecting upwardly through a cover 19 of the machine housing. Arm 15 also has a lug 25 supporting an extremity of a lever 4 which is held against the lug by the tension of a spring 5 anchored to the lower end of the arm. The opposite extremity of lever 4 is articulated at 6 to a lever 7 of inverted J-shape and terminates in a stepped profile 3 juxtaposed with a toothed extremity 11, 11′ of lever 7. The latter has a fixed fulcrum at 8 and is provided with an extension 9 engaged by a spring 10 which is also anchored to the lower end of lever 15. An extension 23 of arm 15 co-operates with an alarm device here shown as a bell 24.

Stepped profile 3 of lever 4 confronts a pusher bar 1 which is normally out of line with that profile and reciprocable in the direction of arrow E while being biased away from lever 4 by a spring 2. A retaining pawl 12 coacts with the teeth 11 of lever 7 with which it is urged into contact by a spring 63, the swing of pawl 12 being limited by a fixed stop 64. Lever 7 also has a shoulder 13 normally overlying a lug 14 of arm 15 to prevent the rise of the latter under the action of spring 10.

As illustrated in FIG. 4, arm 1 forms an extension of a bar 65 carrying a pawl 66 for the stepping of a ratchet wheel 67 which is rigid with a gear 68 engaged by a rack 69; the latter controls the digit-by-digit displacement (arrow F) of the pin carriage 70 representing the multiplicand register of the arithmetic unit. Bar 1 is limitedly swingable on arm 65 about a pin 71, between stops 72 and 73, and is biased by a toggle spring 74 anchored to the two members 1 and 65. Arm 65 is guided for its oscillatory motion, in the direction of arrow E, by pins 75 received in slots 76 (only one shown) of the arm; whenever a digital slide 56 of multiplier regisert 55 has been restored to zero (or found to be in zero position), bar 65 performs one reciprocation by being momentarily displaced, in the manner described in our aforementioned copending application and patent, against the force of restoring spring 2. This oscillation brings the pawl 66 into engagement with one of the teeth of ratchet wheel 67 which is thereupon stepped by one tooth to shift the pin carriage 70 by one denominational order or decade; a retaining pawl 77 holds the ratchet in its new position. Upon the arrival of carriage 70 in its units position, an arm 78 rigid with ratchet 67 swings into alignment with an extension 79 of bar 1 so that the latter, during its return stroke under the force of restoring spring 2, is swung past dead center into its alternate position illustrated in dot-dash lines in FIGS. 2 and 4 whereby the forward end of this arm moves into line with the first step of profile 3. It is assumed in this embodiment that the stepping mechanism controlling the motion of arm 65 does not come to a halt immediately upon the termination of multiplication, as ascertained by sensing device 53, but continues its operation until the carriage 70 has returned to normal and thereafter executes two more cycles so that assembly 1, 65, 66 oscillates twice more without any further stepping of ratchet wheel 67. Thus, the capacity of the totalizer is exceeded only if assembly 1, 65, 66 executes more than two strokes after the carriage 70 has reached home, i.e. after arm 78 has tripped the bar 1 into its alternate position aligned with stepped profile 3. On the first of these strokes, bar 1 engages the first step of the profile and swings the arm 7 clockwise (FIG. 2 to a sufficient extent to let pawl 12 drop behind the first tooth 11. After the second step, during which bar 1 has engaged the second step of profile 3, pawl 12 has moved in behind the second tooth 11′ of lever 7. At this point the lug 14 of arm 15 is still overlain by shoulder 13 of lever 7 so that the arm cannot rise; this means that the link 22 remains free to move in the direction of arrow B even though bar 1 oscillates twice after the carriage 70 has arrived in its terminal position. If, however, a further oscillation of bar 1 occurs thereafter, the tip of the bar bears upon the third step of profile 3 whereupon shoulder 13 clears the lug 14 and releases the arm 15 which now rises into its phantom-line position, blocking the rightward displacement of bar 22 and causing its extension 23 to strike the alarm bell 24. At the same time, pushbutton 18 (which may be distinctly colored) rises above cover 19 to indicate visually the blocked condition of the printer by reason of totalizer overload. The user may thereupon depress pushbutton 18 to release the bar 22 from its detent 21, causing the printing of the result by the delayed actuation of key 39 (FIG. 1) through the force stored in spring 35.

The control mechanism for the delayed actuation of key 39 (FIG. 1) is claimed in our copending application Ser. No. 636,718 of even date.

We claim:

1. In a calculator provided with an arithmetic unit, including a shiftable multiplicand register and a shiftable multiplier register, for the performance of multiplications whose results are stored in a totalizer, the combination therewith of a manually depressible key for causing registration of a result stored in the totalizer, sensing means associated with said multiplier register for ascertaining the completion of a multiplication, actuating means for said operating means responsive to an end-of-multiplication signal from said sensing means, blocking means for said key effective in an off-normal position of said multiplicand register, and resilient link means coupling said key with said actuating means for storing the force of the latter in a blocked condition of said operating means, said link means comprising a first lever engageable by said actuating means, a second lever bearing upon said key and spring means interconnecting said levers, said key being provided with biasing means counteracting the force transmitted to it via said second lever.

2. The combination defined in claim 1 wherein said arithmetic unit includes mechanism for ascertaining an exhaustion of the storage capacity of the totalizer, further comprising arresting means coupled with said mechanism for control thereby to arrest said operating means independently of said blocking means.

3. The combination defined in claim 2 wherein said arresting means comprises a stop member in the path of said key.

4. The combination defined in claim 3, further including a numerical printer controlled by said key by way of said stop member.

5. The combination defined in claim 1 wherein said multiplicand register comprises a shiftable pin carriage, said blocking means being coupled with said pin carriage for release in a terminal position thereof.

References Cited

UNITED STATES PATENTS

| | | | |
|---|---|---|---|
| 2,984,412 | 5/1961 | Sundstrand | 235—60.2 |
| 3,005,585 | 10/1961 | Capellard et al. | 235—60 X |
| 3,082,942 | 3/1963 | Schenk | 235—60 |
| 3,223,318 | 12/1965 | Gassino | 235—60 |
| 3,268,165 | 8/1966 | Gelling | 235—60 |
| 3,312,391 | 4/1967 | Gelling | 235—60 |

RICHARD B. WILKINSON, Primary Examiner
STANLEY A. WAL, Assistant Examiner